(12) United States Patent
Nunes et al.

(10) Patent No.: US 9,976,920 B2
(45) Date of Patent: May 22, 2018

(54) DETECTION OF STRAIN IN FIBER OPTICS CABLES INDUCED BY NARROW-BAND SIGNALS

(71) Applicant: Halliburton Energy Services, Inc., Houston, TX (US)

(72) Inventors: Leonardo de Oliveira Nunes, Rio de Janeiro (BR); David Andrew Barfoot, Houston, TX (US); Andreas Ellmauthaler, Rio de Janeiro (BR); Yenny Natali Martinez, Houston, TX (US); Xinwei Lan, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days. days.

(21) Appl. No.: 15/320,820

(22) PCT Filed: Sep. 14, 2015

(86) PCT No.: PCT/US2015/049977
§ 371 (c)(1),
(2) Date: Dec. 21, 2016

(87) PCT Pub. No.: WO2017/048223
PCT Pub. Date: Mar. 23, 2017

(65) Prior Publication Data
US 2017/0268944 A1 Sep. 21, 2017

(51) Int. Cl.
*G01L 1/24* (2006.01)
*E21B 49/00* (2006.01)
(Continued)

(52) U.S. Cl.
CPC .............. *G01L 1/246* (2013.01); *E21B 47/12* (2013.01); *E21B 49/00* (2013.01); *E21B 49/08* (2013.01);
(Continued)

(58) Field of Classification Search
CPC ......... G01B 11/16; G01L 1/246; E21B 49/00; E21B 49/08; E21B 47/12
(Continued)

(56) References Cited

U.S. PATENT DOCUMENTS

| 4,653,916 A | 3/1987 | Henning et al. |
| 4,947,037 A | 8/1990 | Nash et al. |

(Continued)

FOREIGN PATENT DOCUMENTS

| EP | 0190859 A2 | 8/1986 |
| GB | 2334104 A | 8/1999 |
| GB | 2535525 A | 8/2016 |

OTHER PUBLICATIONS

Purnachandar Poshala, Why Oversampling when Undersampling can do the Job?, Application Report, Texas Instruments Inc., SLAA594A—Jun. 2013—Revised Jul. 2013.*

(Continued)

*Primary Examiner* — Roy M Punnoose
(74) *Attorney, Agent, or Firm* — McDermott Will & Emery LLP (57) ABSTRACT

A method may include transmitting a narrowband signal into a formation using a transmitter located in a wellbore. The narrowband signal is modified by passage of through the formation and the formation reflects at least a portion of the narrowband signal back to the wellbore resulting in a modified narrowband signal having a first frequency. The method also includes sensing the modified narrowband signal with an optical waveguide positioned in the wellbore, transmitting a source signal along a length of the optical waveguide, and obtaining a backscattered return signal from the optical waveguide. The backscattered return signal is sampled at a second frequency that is less than the Nyquist rate of the modified narrowband signal. The method further (Continued)

includes processing the backscattered return signal to obtain an amplitude of the modified narrowband signal.

19 Claims, 7 Drawing Sheets

(51) Int. Cl.
  *E21B 49/08* (2006.01)
  *E21B 47/12* (2012.01)
  *E21B 43/20* (2006.01)
(52) U.S. Cl.
  CPC ......... *E21B 43/20* (2013.01); *E21B 2049/085* (2013.01)
(58) Field of Classification Search
  USPC .......................................................... 356/32
  See application file for complete search history.

(56) References Cited

U.S. PATENT DOCUMENTS

| | | | | |
|---|---|---|---|---|
| 5,682,099 | A * | 10/1997 | Thompson | G01V 3/30 |
| | | | | 324/338 |
| 7,274,441 | B2 | 9/2007 | Payton | |
| 7,764,363 | B2 | 7/2010 | Hayward et al. | |
| 8,584,519 | B2 * | 11/2013 | Maida | E21B 47/16 |
| | | | | 73/152.54 |
| 9,003,874 | B2 * | 4/2015 | Samson | E21B 47/16 |
| | | | | 73/152.54 |
| 2005/0006090 | A1 * | 1/2005 | Chemali | E21B 17/1078 |
| | | | | 166/250.01 |
| 2007/0171402 | A1 | 7/2007 | Watley et al. | |
| 2010/0107754 | A1 * | 5/2010 | Hartog | E21B 47/101 |
| | | | | 73/152.47 |
| 2011/0280103 | A1 * | 11/2011 | Bostick, III | E21B 47/101 |
| | | | | 367/35 |
| 2011/0292763 | A1 * | 12/2011 | Coates | E21B 47/01 |
| | | | | 367/25 |
| 2012/0013893 | A1 * | 1/2012 | Maida | E21B 47/123 |
| | | | | 356/73.1 |
| 2012/0014211 | A1 | 1/2012 | Maidra, Jr. et al. | |
| 2012/0297883 | A1 | 11/2012 | Kupershmidt | |
| 2013/0113629 | A1 * | 5/2013 | Hartog | G01V 1/226 |
| | | | | 340/853.2 |
| 2013/0298665 | A1 * | 11/2013 | Minchau | E21B 43/26 |
| | | | | 73/152.51 |
| 2014/0022537 | A1 * | 1/2014 | Samson | E21B 47/123 |
| | | | | 356/73.1 |
| 2014/0139225 | A1 * | 5/2014 | Mandviwala | G01V 3/26 |
| | | | | 324/344 |
| 2014/0139226 | A1 | 5/2014 | Jaaskelainen et al. | |
| 2014/0150523 | A1 | 6/2014 | Stokley et al. | |
| 2017/0074688 | A1 * | 3/2017 | Crickmore | G01D 18/00 |

OTHER PUBLICATIONS

Reid, Gregory John, Thesis entitled a Technique for Multiplexing 3×3-Coupler Terminated Interferometric Fiber-Optic Sensors, Naval Postgraduate School, Monterey, CA, NPS-PH-94-002, 1993.
Bush et al., Low-Cost Interferometric TDM Technology for Dynamic Sensing Applications, OpticsEast 2004, Fiber Optic Sensor Technology and Applications III, paper 5589-19.
Product Data Sheet, 90° Optical Hybrid, Optoplex Corporation, Retrieved from the Internet, http://www.optoplex.com/Optical_Hybrid.htm, 2014.
ISR/WO for PCT/US2015/049977 dated May 25, 2016.
Search Report received in corresponding IE Application 2016/0183, dated Oct. 3, 2016.

* cited by examiner

DETECTION OF STRAIN IN FIBER OPTICS CABLES INDUCED BY NARROW-BAND SIGNALS

BACKGROUND

In the oil and gas industry, it can be required to measure the characteristics and/or compositions of substances located at remote subterranean locations and convey the results to the surface for processing. For instance, it may be required to measure chemical and/or physical properties of substances located in subterranean hydrocarbon-bearing formations and convey the results of the measurement over a long distance to the earth's surface. These properties may vary continuously and, therefore, it is often desired to measure these properties at a high frequency in order to capture the variations.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure describes systems and methods of calculating a gain of a narrowband signal independently of the frequency of the narrowband signal.

Embodiments disclosed herein may permit de-coupling of the frequency at which a property or characteristic of a component or a substance in the wellbore is measured and the frequency at which the measured property or characteristic is recovered (e.g., transmitted uphole) for analysis. As a result, it may be possible to measure properties or characteristics of downhole substances using high frequency instruments (e.g., ultrasonic measuring instruments) and use low frequency instruments to transmit the measured properties or characteristics uphole for further analysis. The principles of the present disclosure may be utilized in a variety of applications involving acoustic sensing, such as flow detection and flow regime estimation, and applications involving electromagnetic (EM) sensing, such as cement cure monitoring, acoustic calipering, fluid identification, and downhole impedance measurements. For instance, embodiments disclosed herein may permit these applications to measure wellbore characteristics using high frequency instruments, while the measured data may be retrieved for processing using existing low frequency instruments. Those skilled in the art will readily appreciate that the embodiments described herein provide advanced methods of conducting a high frequency examination of a wellbore without investing in new tools, new tool hardware, or adaptations of existing tools.

Figure 1A:
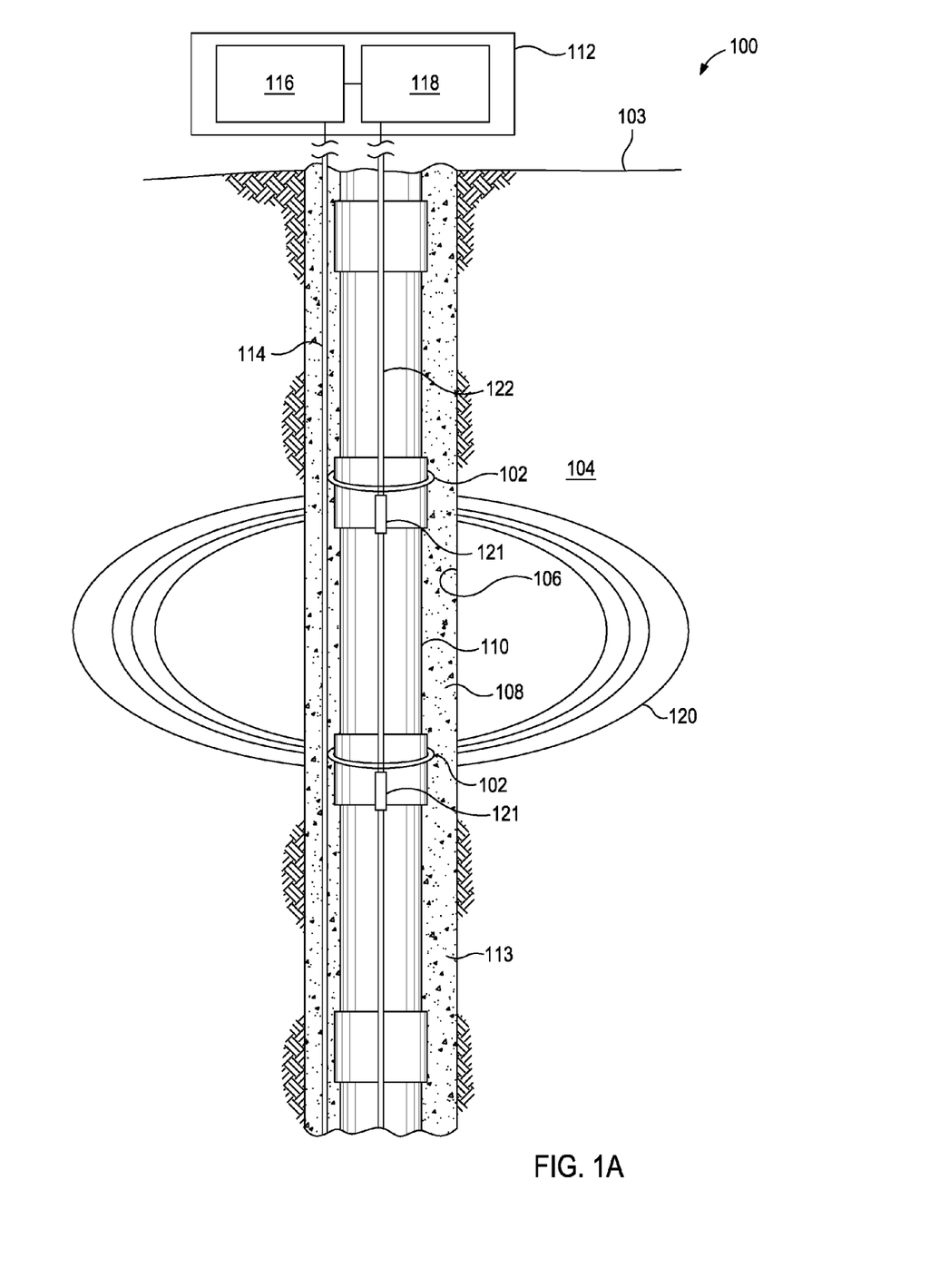
FIG. 1A illustrates an exemplary well monitoring and measurement system that may employ the principles of the present disclosure.

Referring to FIG. 1A, illustrated is an exemplary well monitoring and measurement system 100 that may employ the principles of the present disclosure. It may be noted that the well monitoring and measurement system 100 can be used in a land-based operation as well as in any sea-based or sub-sea application including a floating platform or sub-surface wellhead installation, as generally known in the art. As illustrated in FIG. 1A, one or more transmitters 102 (two shown) may be located downhole in a wellbore 106 drilled in an earth formation 104. For instance, the transmitters 102 may be located in an annulus 108 formed between the wellbore 106 and a casing 110 secured therein via cement 113.

The transmitters 102 may be connected to each other and to an interface 112 located on the earth's surface 103 via a control cable 114. The transmitters 102 may be connected in series, in parallel, or a combination thereof. The control cable 114 may take different forms (e.g., a tubing encapsulated cable) and may include embedded electrical conductors and/or optical waveguides (e.g., fibers) that transmit electrical power and control instructions to the transmitters 102. The interface 112 may include a controller 116 to direct the operations of the transmitters 102.

Based on control signal(s) from the interface 112, the transmitters 102 may each generate, either simultaneously or at different times, a high frequency (e.g., greater than 100 kHz) narrowband signal 120, the characteristics of which, such as amplitude, frequency, and/or phase, are under user control via the interface 112. In an embodiment, the signal 120 may be an electromagnetic (EM) signal and may be generated by transmitters 102 that comprise coils external to the casing 110, as illustrated in FIG. 1A. In another embodiment, the signal 120 may be an acoustic signal and the transmitter 102 may be any acoustic signal generator known in the art. The transmitters 102 may be positioned in another wellbore, at the earth's surface, or in another location. The scope of this disclosure is not limited to any particular position of a transmitter, to any particular type of transmitter, or to any particular technique for generating and transmitting the signal 120 in the formation 104.

The formation 108 and/or the cement 113 may modify the characteristics of the signal 120 (EM or acoustic). The modified signal is detected by sensors 121 coupled to an optical waveguide 122 (such as, an optical fiber or an optical ribbon) positioned in the annulus 108. In some embodiments, the optical waveguide 122 may be attached external to the casing 110. In other embodiments, the optical waveguide 122 including the sensors 121 may be deployed in the casing 110 using wireline. In yet other embodiments, the optical waveguide 122 may be positioned at a boundary of the cement 113 (e.g., adjacent the wall of the wellbore 106). In such embodiments, the transmitters 120 may be located at an opposite boundary of the cement 113 and the signal 120 may therefore traverse the cement 113 before being detected by the sensors 121 of the optical waveguide 122.

In an example, the frequency of the signal 120 emitted from the transmitter 102 can be varied and a modified signal including a spectrum of frequencies is obtained from the formation. Illustrative examples of a substance or property of interest that can be detected by the sensors 121 can include, for example, chemical composition (e.g., identity and concentration in total or of individual components), phase presence (e.g., gas, oil, water, etc.), impurity content, pH, alkalinity, viscosity, density, ionic strength, total dissolved solids, salt content (e.g., salinity), porosity, opacity, bacteria content, total hardness, transmittance, combinations thereof, state of matter (solid, liquid, gas, emulsion, mixtures thereof, etc.), and the like.

Figure 1B:
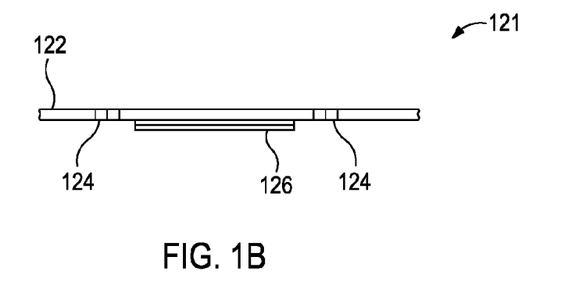
FIGS. 1B-1E each illustrate an exemplary configuration of sensors in FIG. 1A.
Figure 1C:
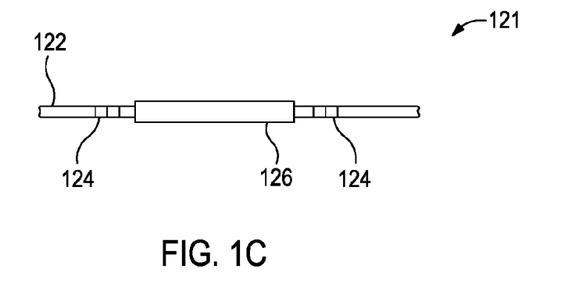
Figure 1D:
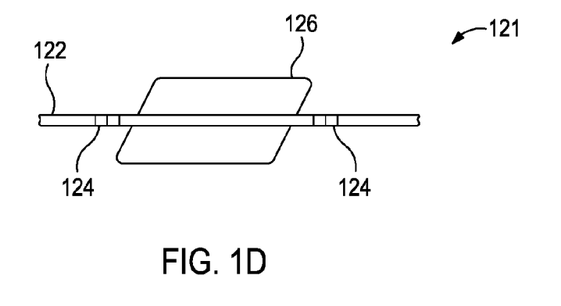
Figure 1E:
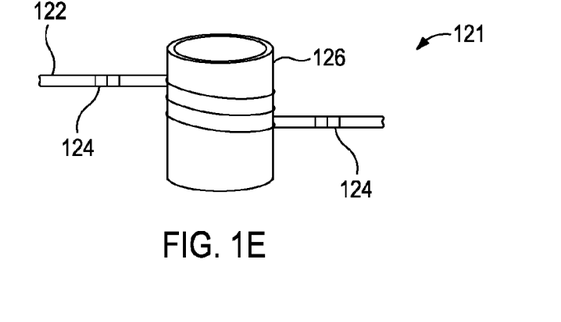

FIGS. 1B-1E each illustrate an exemplary sensor 121 configuration, wherein an optical waveguide 122 is bonded or otherwise attached to a material 126 which changes shape in response to exposure to the EM signal 120 received from the formation 104. As illustrated in FIGS. 1B-1D, the material 126 is bonded to a section of the optical waveguide 122 longitudinally between two fiber Bragg gratings 124. For example, an epoxy may be used to adhere the optical waveguide 122 to the material 126. In FIG. 1B, the material 126 is illustrated in the form of a wire or rod. In FIG. 1C, the optical waveguide 122 is jacketed or coated (surrounded) by the material 126. The material 126 is bonded or otherwise adhered to an outer surface of the optical waveguide 122. In FIG. 1D, the material 126 is illustrated as being planar in form. In FIG. 1E, the optical waveguide 122 is wrapped about the material 126, which is in cylindrical form. In this case, a radial enlargement or contraction of the cylindrical material 126 will change strain in the optical waveguide 122. The optical waveguide 122 may or may not be bonded to the material 126.

The material 126 can comprise a magnetostrictive material (such as, Co, Fe, Ni, and iron-based alloys METGLAS™ and TERFENOL-D™) or an electrostrictive material (such as, lead magnesium niobate (PMN), lead magnesium niobate-lead titanate (PMN-PT), lead zirconate titanate (PZT), and lead lanthanum zirconate titanate (PLZT)).

When the material 126 changes shape, the length of the optical waveguide 122 attached to the material 126 is elongated or contracted between the two Bragg gratings 124. Thus, a change in strain (or change in length per unit length) is induced in the optical waveguide 122 between the Bragg gratings 124 due to the electromagnetic signal 120. The strain can be measured using a variety of interferometry techniques.

Briefly, at the locations of sensors 121, a beam of highly coherent light (such as a laser pulse) transmitted from a surface location into the optical waveguide 122 is modulated by a change in shape of the material 126 due to the electromagnetic field of the EM signal 120. The modulated signal from each sensor 121 travels along the optical waveguide 122 to a signal interrogator (118), where a signal from each sensor 121 is extracted and demodulated and the electromagnetic field strength at each sensor location thereby is determined. In this manner, electromagnetic property of the formation 104 can be mapped along the optical waveguide 122.

The Bragg gratings 124 can be useful in extracting a modulated signal from each sensor 121. For example, in a wavelength division multiplexing method, the Bragg gratings 124 can be used to selectively reflect wavelengths of the beam of highly coherent light so that the signal from one sensor can be distinguished from others at the interrogator 118. The incident beam of light is partially reflected at a first Bragg grating 124. The remaining light travels through a cavity between the Bragg gratings 124 and is again partly reflected at the second grating.

The reflected light from the two Bragg gratings 124 is re-coupled into the same optical fiber and guided to an optical monitor/interrogator 118 (FIG. 1A). There will be a change in phase between the light reflected from the first Bragg grating 124 and light reflected from the second Bragg grating, due to a strain induced in the optical waveguide 122 bonded to material 126 between the Bragg gratings 124.

In an exemplary application, the well monitoring and measurement system 100 may be used for water flood monitoring. Herein, a time-lapse measurement may be performed, in which electric or magnetic fields (of the EM signal 120) are measured as a function of time at each sensor 121. In a time-lapse measurement system, a first measurement is performed at a time when there is no flood and a second measurement is performed at a time in the presence of flood, thereby generating a differential signal. As the flood approaches closer to a sensor 121, the differential signal gets larger. The intensity of the differential signal indicates a distance to the flood front. The change in the electrical (or magnetic) field induces a change in shape of the material 126, which in turn induces a change in strain in the optical waveguide 122. The change in strain is measured using interferometry techniques known in the art.

In the case where an acoustic signal 120 is emitted by the transmitter 102, the sensors 121 may be absent. The interaction of the optical waveguide 122 with the modified acoustic signal 120 received from the formation 104 or the cement 113 produces a strain in the optical waveguide 122, which is translated into a change in the phase of the backscattered light. Distributed acoustic sensing (DAS) may be used to measure the strain change in the optical waveguide 122 due to acoustic signal 120. Briefly, in DAS, an optical monitor/interrogator 118 located at the interface 112 may inject a beam of highly coherent light, such as a laser pulse, in the optical waveguide 122. The strain change in the optical waveguide 122 due to the acoustic signal 120 results in a change in a path length and/or a change in the refractive index of the optical waveguide 122, which causes an optical phase shift in the backscattered return signal. The phase shift is detected and analyzed by the optical monitor/interrogator 118 to determine the location of the component or the substance in the wellbore 106.

DAS is discussed herein as an example of interferometric phase modulation techniques used for measuring the strain change in the optical waveguide 122. However, embodiments disclosed herein are not limited thereto. Other interferometry techniques wherein the information of interest is conveyed in the phase and the rate at which the backscattered light is sampled (or, in other words, the rate at which the change in strain is interrogated) is less than the Nyquist rate (which is twice the frequency of the narrowband signal 120 received at the optical waveguide 122 can also be used. For example, in the case of DAS, the rate at which the backscattered light is sampled is around 10 KHz, while the frequency of the narrowband signal 120 is greater than 100 KHz (Nyquist frequency rate being greater than 200 KHz).

The change in phase in the backscattered return signal due to a change in strain caused by the high frequency narrowband acoustic signal 120 received from the formation 104 or the cement 113 can be measured using a variety of detection methods, two of which are disclosed herein below as the heterodyne detection method and the homodyne detection method.

Figure 2:
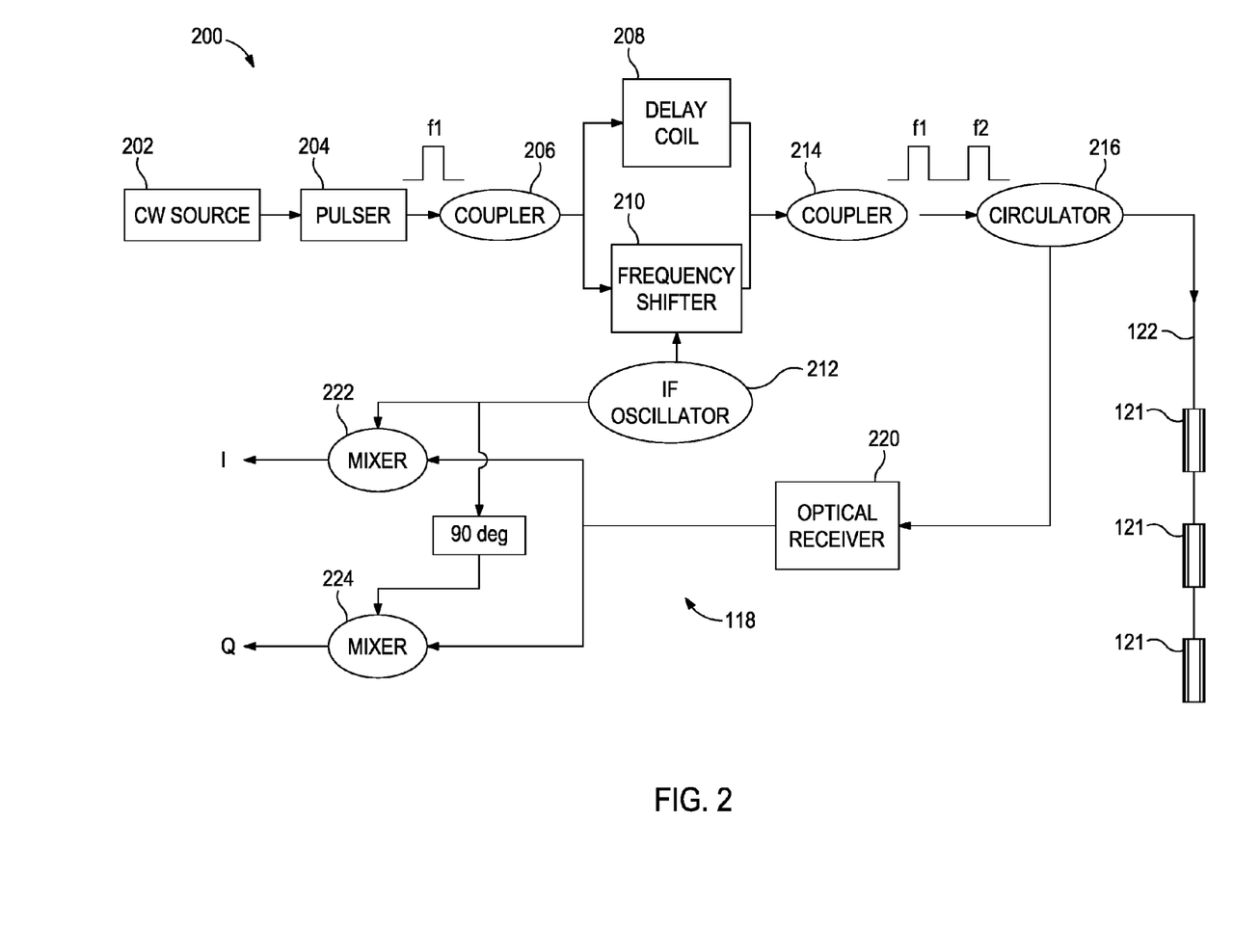
FIG. 2 is a block diagram of an exemplary heterodyne interrogation technique.

Referring to FIG. 2, an example of a heterodyne interrogation scheme 200 that may be applied to the system 100 in FIG. 1A is representatively illustrated. The heterodyne interrogation scheme 200 may be implemented in the optical monitor/interrogator 118. In the heterodyne interrogation scheme 200, each sensor 121 (FIGS. 1B-1E) comprises a pair of point reflectors (e.g., Fiber Bragg Gratings, etc.), with the optical waveguide 122 between the reflectors. The optical waveguide 122 between the reflectors undergoes a strain based on the parameter being measured. The strain changes in the optical waveguide 122 between adjacent point reflectors causes difference in path length of light transmitted in the optical waveguide 122 from a surface location. The path length difference causes a phase change in the back reflected light. In an embodiment, the sensors 121 may be absent and optical waveguide 122 between a pair of "virtual" reflectors undergoes strain with the distance between a "virtual" reflector pair corresponding to half the length of the delay coil. The "virtual" reflectors are not physical reflectors, but are predetermined points along the optical waveguide 122 and a location of which is determined by the time of flight of the backscattered light. For instance, if a one meter separation is desired between adjacent "virtual" reflectors, the backscattered light is sampled at time instances corresponding to the time it takes for the emitted pulse to advance two meters (round-trip distance). The strain changes in the optical waveguide 122 between adjacent "virtual" reflectors causes difference in path length of light transmitted in the optical waveguide 122 from a surface location. The path length difference causes a phase change in the backscattered light. It should be noted that, for ease of explanation, backscattered and back reflected may be used interchangeably and indicate light being reflected back to the monitor/interrogator 118 either due to the presence of the "virtual" reflectors or point reflectors.

The optical waveguide 122 is interrogated with two pulses f1, f2 that are spaced at twice the distance between the two reflectors, such that the reflection of the two pulses f1, f2 will arrive back at the optical monitor/interrogator 118 at the same time.

In this example, to determine the phase measurement, the pulses f1, f2 will be shifted in frequency relative to each other by a frequency known as the intermediate frequency (IF). This intermediate frequency will be extracted at the optical monitor/interrogator 118 from, for instance, a square-law mixing of the two reflected pulses f1, f2, which overlap.

Phase measurement is made using the IF or beat frequency. The IF signal is shifted down to baseband by a pair of mixers 222, 224, which mix the signal from the optical receiver 220 with an IF oscillator 212 generated sinusoid at the same IF.

One mixer 222 receives the IF oscillator 212 signal directly and the second mixer 224 receives a 90 degree shifted version of the oscillator signal. By doing this, the output of one mixer 222 contains the in-phase (I) measurement of the phase and the second mixer 224 contains the quadrature (Q) measurement of the phase.

These I and Q signals are sampled simultaneously by two analog to digital converters (not shown). Phase can be calculated from the inverse tangent of Q/I. The mixing operations can also be performed digitally if the signal is sampled at a sufficiently high rate.

For providing the two pulses f1, f2, a pulse generator 204 receives light from a continuous wave (CW) source 202 and outputs a pulse that is split into two paths with one path having a delay coil 208 to provide the pulse separation. Additionally, one of the paths contains a frequency shifting device 210 (for example, an acousto-optic modulator) that shifts the light frequency by the intermediate frequency. The pulse generator 204 is coupled to the delay coil 208 and the frequency shifting device 210 via a coupler 206. The outputs of the delay coil 208 and the frequency shifting device 210 are provided to another coupler 214 which is connected to a circulator 216 that receives the backscattered return pulses from the one or more sensors 121.

Figure 3:
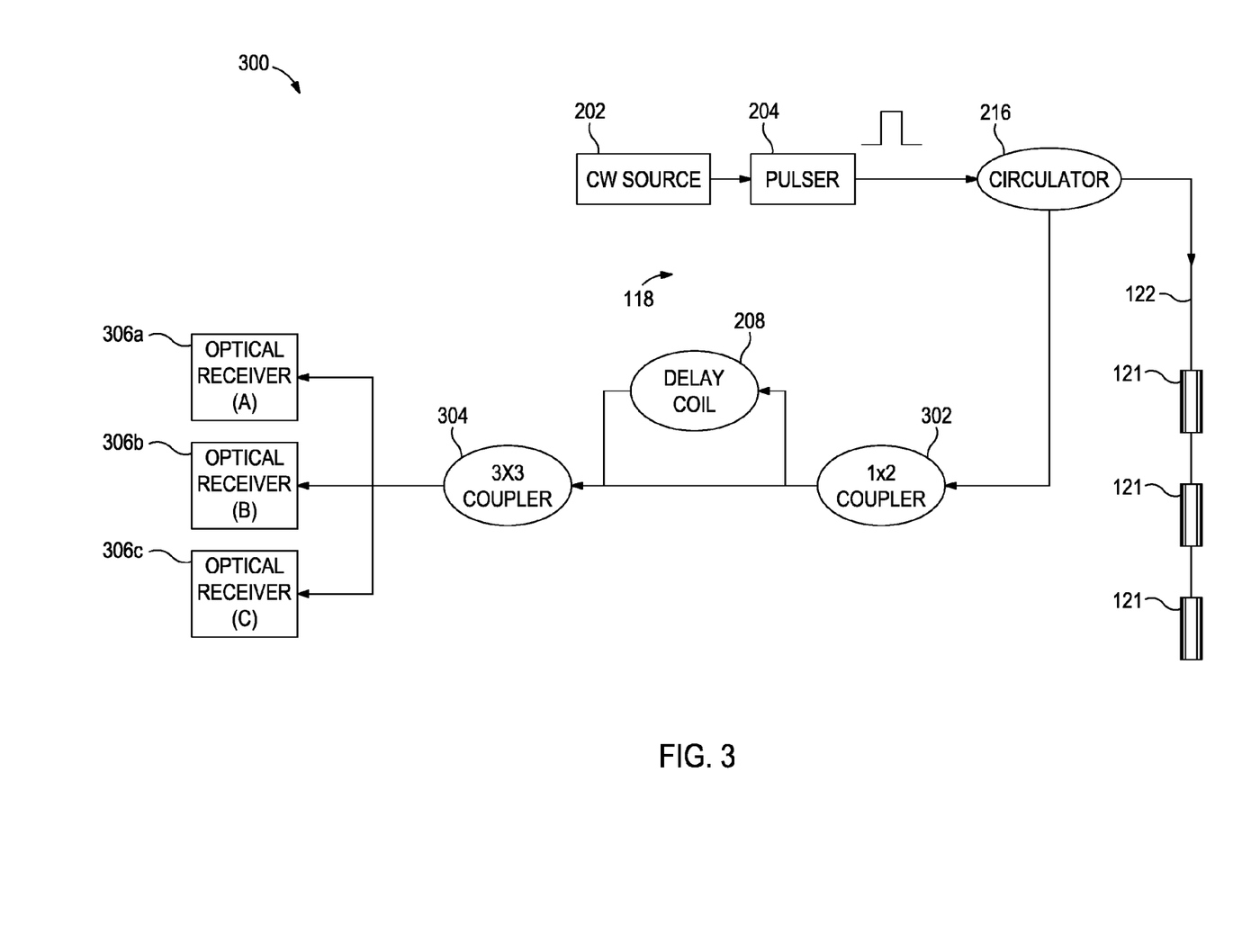
FIG. 3 is a block diagram of an exemplary homodyne interrogation technique.

Referring to FIG. 3, an example of a homodyne interrogation scheme 300 that may be applied to the system 100 is representatively illustrated. The homodyne interrogation scheme 300 may be implemented in the optical monitor/interrogator 118. In the homodyne interrogation scheme 300, a single optical interrogation pulse is sent along the optical waveguide 122.

A pulse generator 204 receives light from a continuous wave (CW) source 202 and outputs interrogation pulse to a circulator 216. The circulator 216 transmits the interrogation pulse to the optical waveguide 122. As mentioned above, each sensor 121 on the optical waveguide 122 comprises a pair of point reflectors (or "virtual" reflectors, if present), with the optical waveguide 122 between the reflectors. The optical waveguide 122 undergoes a strain based on the parameter being measured.

As the interrogation pulse travels through the optical waveguide 122, imperfections in the optical waveguide 122 may cause a portion of the interrogation pulse to be backscattered along the optical waveguide 122. The backscattered return interrogation pulse may travel back through the optical waveguide 122 until it reaches the circulator 216 that redirects the backscattered return interrogation pulse to a 1×2 coupler 302. The 1×2 coupler 302 splits the backscattered return interrogation pulse such that half the backscattered return interrogation pulse travels through the bottom path and half the backscattered return interrogation pulse travels through the top path.

The delay coil 208 of length equal to twice the distance between the two reflectors delays the pulse from the top path so that, as the two pulses recombine at a 3×3 coupler 304, they correspond to two distinct positions along the fiber constituting one pair of point reflectors (or "virtual" reflectors, if present). The overlapping pulses leave the 3×3 coupler 304 on the three legs of the coupler 304. The phases of the pulses in the three legs relative to each other are shifted differently for each leg of the coupler 304 based on coupled mode theory. In this manner, the 3×3 coupler 304 will provide three interferometric signals. For example, the first leg will contain the combined signals from the reflectors. The second leg will contain the combined signals shifted by +120 degrees. The third leg will contain the combined signals shifted by −120 degrees.

The three legs of the coupler 304 effectively receive phase delays (in addition to the actual phase delay between the light reflected from each of the reflectors of the sensor 121) of 0, +120, and −120 degrees. These three interferometric signals provide enough phase diversity to calculate the phase difference between the light reflected from each of the reflectors of the sensor 121 as follows:

$I = \sqrt{3} * A - B$ $Q = A + B - 2C$ $PHASE = ARCTAN(Q/I)$ wherein A, B and C are the signals received from the three legs of the coupler 304, respectively. In another embodiment, a 90-degree optical hybrid that directly outputs the I/Q signals can be used instead of 3×3 coupler 304.

For the sake of simplicity, the below-mentioned process has been described with respect to a single transmitter 102; however, it will be understood that the process is equally applicable to all transmitters 102. It should also be noted that the below-mentioned process takes into consideration the amplitude (or the energy) of the modified signal 120 (FIG. 1A) sensed by the optical waveguide 122 (FIG. 1A). The modified signal 120 incident on the optical waveguide 122 may be generally represented as:

$$x(t) = A_E \cos(\omega_E t + \Phi_E)$$

where $A_E$, $\Phi_E$, and $\omega_E$ are the amplitude, phase, and frequency of the signal x(t), respectively. For ease of explanation, it is assumed that the signal 120 emitted from the transmitter 102 interacts with the formation 104 and/or the cement 113, and the amplitude of the signal 120 is modified based on the interaction, while the frequency $\omega_E$ and phase $\Phi_E$, are assumed to be unchanged. Accordingly, the amplitude of the signal emitted from the transmitter 102 is different from the amplitude $A_E$, while the frequency $\omega_E$ and phase $\Phi_E$, of the signal emitted from the transmitter 102 are unchanged. The signal x(t) may induce strain changes in the optical waveguide 122. As mentioned above, a highly coherent light (e.g., a laser pulse) may be injected into the optical waveguide 122 and may be either back-reflected due to discrete points (e.g., Fiber Bragg Grating) placed along the fiber or may be backscattered continuously due to Rayleigh backscattering. The strain change caused by the signal x(t) (or by the material 126 (FIGS. 1B-1E) attached to the optical waveguide 122) may provoke a phase change in the backscattered (or back-reflected) return signal. The backscattered return signal may be detected by the optical monitor/interrogator 118. For the sake of explanation, we assume a homodyne detection of the backscattered return signal, although the explanation below is equally applicable to heterodyne detection of the backscattered return signal. The backscattered return signal may be represented as:

$$y(t) = Q(t) + jI(t) = A_O e^{jx(t)} = A_O e^{j(A_E \cos(\omega_E t + \Phi_E))}$$

where $A_O$ is the complex optical gain of the signal y(t).

The signal y(t) can be written in the following form:

$$y(t) = A_O \sum_n j^n J_n(A_E) e^{j(n\omega_E t + \Phi_E)}$$

where $J_n$ represents the $n^{th}$ order Bessel function of the signal x(t). From the equation above, it may be noted that the spectrum of the detected signal y(t) may be composed of lines on $\omega_E$ and its multiples, the amplitudes of which may be determined by the Bessel function of appropriate order of amplitude $A_E$. The signal y(t) may be filtered using a low-pass filter having a cut-off frequency at or about $\omega_E$ and the following signal may be obtained:

$$y_{DC}(t) = A_O J_0(A_E)$$

which represents a number in the complex plane (or, z-plane), assuming the optical gain $A_O$ is constant.

In order to correctly estimate the amplitude $A_E$, it may be required to estimate the complex optical gain $A_O$. In an embodiment, the optical monitor/interrogator 118 may issue a command to the controller 116 to switch off the transmitter 102. The optical monitor/interrogator 118 may measure amplitude of signal $y_{DC}$ while the transmitter 102 is off. The optical monitor/interrogator 118 may then issue another command to the controller 116 to turn on the transmitter 102, and may measure the amplitude of the signal $y_{DC}$ while the transmitter 102 is ON. The optical monitor/interrogator 118 may then calculate a difference in the amplitudes to obtain an estimate of the complex optical gain $A_O$.

Figure 4:
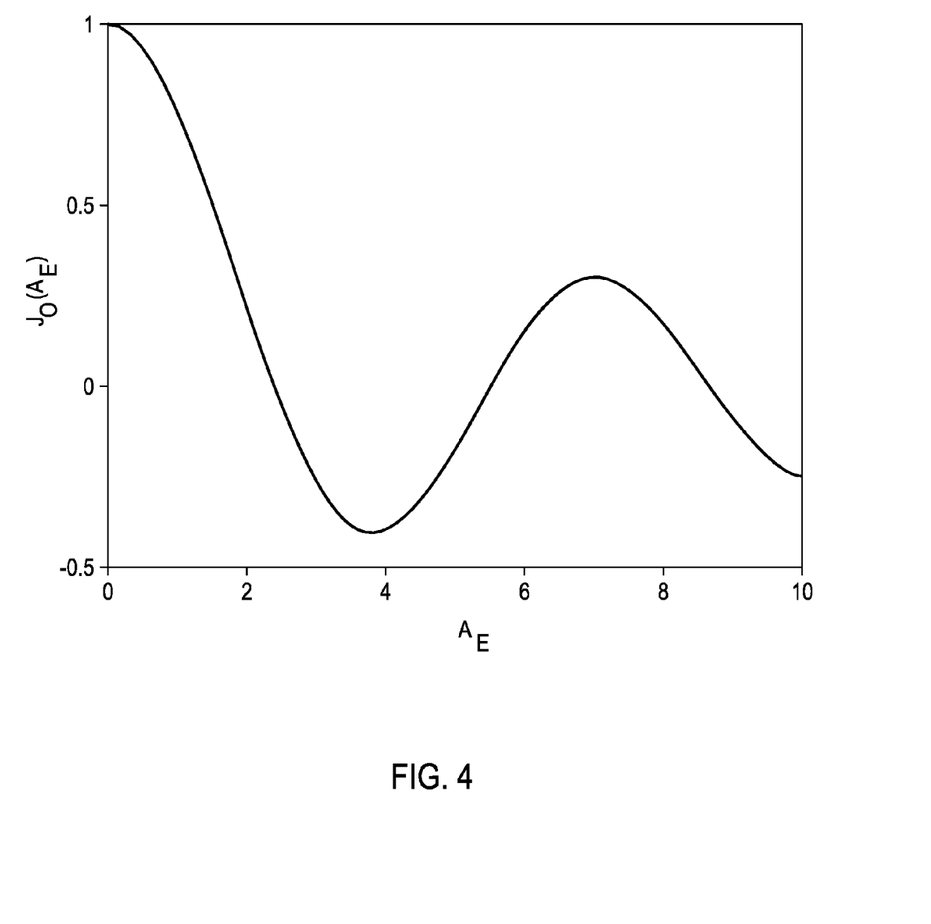
FIG. 4 illustrates an exemplary plot of the zero order Bessel function of a signal incident on the optical waveguide of FIG. 1A as a function of amplitude of the signal.

FIG. 4 illustrates a sample plot of the zero order Bessel function $J_0(A_E)$ as a function of signal amplitude $A_E$, wherein it may be seen that $J_0$ is not a monotonic function. Referring to FIG. 4, it may be possible to measure amplitude $A_E$ unequivocally if the amplitude $A_E$ is below a certain value. Since the operation of the transmitter 102 can be controlled, it may be possible to control the transmitter 102 (e.g., by reducing its transmission power) such that the received amplitude $A_E$ of the signal x(t) is decreased. For instance, from the illustrated plot, for the zero order Bessel function $J_0(A_E)$ value of "0," the amplitude $A_E$ may be 2.3, 5.5, and 8.3, approximately. In order to obtain an unambiguous value of amplitude $A_E$ of the received signal x(t), the transmitter 102 may be controlled such that amplitude $A_E$ may be reduced to less than "2." Thus, it may be seen that unambiguous values of the zero order Bessel function $J_0(A_E)$ may be obtained for an amplitude $A_E$ value less than around "2".

As is seen, the equation for $y_{DC}(t)$ above does not contain any term representing the frequency $\omega_E$ of the signal x(t) incident on the optical waveguide 122. It may thus be determined that the amplitude $A_E$ may be obtained independently of the frequency $\omega_E$ of the incident signal x(t). Accordingly, it may be possible to measure a property of a substance in the wellbore using a high frequency (e.g., greater than 100 KHz) tool and sample the measured property at a lower frequency (e.g., less than 10 KHz).

Figure 5:
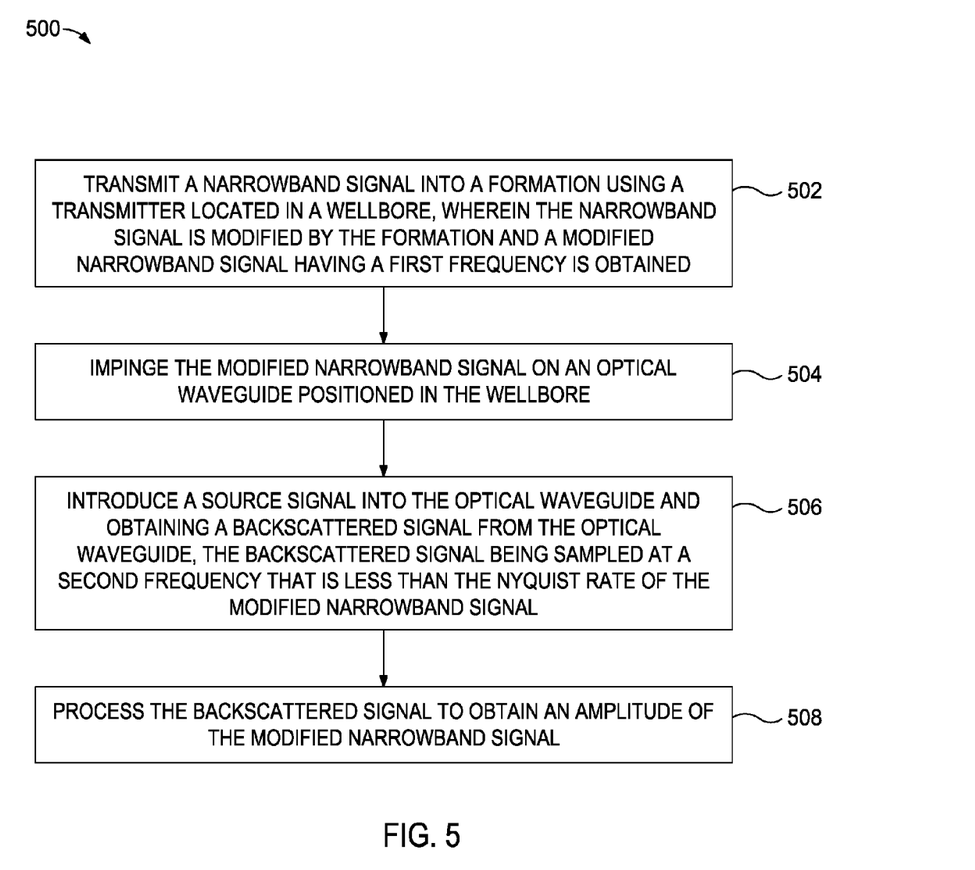
FIG. 5 is a flowchart of an exemplary method of calculating an amplitude of the signal incident on the optical waveguide of FIG. 1A.

FIG. 5 is a flowchart of an exemplary method 500 of calculating an amplitude of the signal incident on the optical waveguide of FIG. 1A. The method 500 may include transmitting a narrowband signal into a formation using a transmitter located in a wellbore, as at 502. The narrowband signal is modified by passage through the formation and the formation reflects at least a portion of the narrowband signal back to the wellbore resulting in a modified narrowband signal having a first frequency. The method 500 may also include sensing the modified narrowband signal with an optical waveguide positioned in the wellbore, as at 504, and transmitting a source signal along a length of the optical waveguide and obtaining a backscattered return signal from the optical waveguide, as at 506. The backscattered return signal is sampled at a second frequency that is less than twice the Nyquist rate of the modified narrowband signal. The method 500 may further include processing the backscattered return signal to obtain an amplitude of the modified narrowband signal sensed with the optical waveguide, as at 508.

Figure 6:
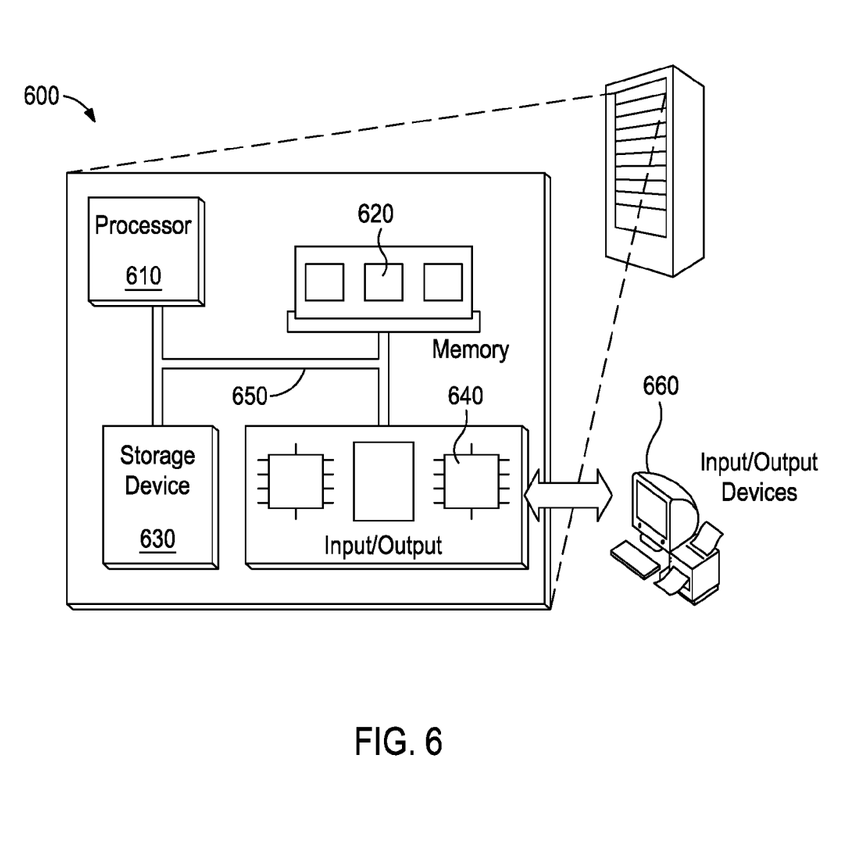
FIG. 6 illustrates an exemplary processing system for implementing one or more embodiments of the disclosure.

FIG. 6 shows an illustrative processing system 600 for implementing one or more embodiments of the disclosure. The system 600 may include a processor 610, a memory 620, a storage device 630, and an input/output device 640. Each of the components 610, 620, 630, and 640 may be interconnected, for example, using a system bus 650. The processor 610 may be processing instructions for execution within the system 600. In some embodiments, the processor 610 is a single-threaded processor, a multi-threaded processor, or another type of processor. The processor 610 may be capable of processing instructions stored in the memory 620 or on the storage device 630. The memory 620 and the storage device 630 can store information within the computer system 600.

The input/output device 640 may provide input/output operations for the system 600. In some embodiments, the input/output device 640 can include one or more network interface devices, e.g., an Ethernet card; a serial communication device, e.g., an RS-232 port; and/or a wireless interface device, e.g., an 802.11 card, a 3G wireless modem, or a 4G wireless modem. In some embodiments, the input/output device can include driver devices configured to receive input data and send output data to other input/output devices, e.g., keyboard, printer and display devices 660. In some embodiments, mobile computing devices, mobile communication devices, and other devices can be used.

In accordance with at least some embodiments, the disclosed methods and systems related to scanning and analyzing material may be implemented in digital electronic circuitry, or in computer software, firmware, or hardware, including the structures disclosed in this specification and their structural equivalents, or in combinations of one or more of them. Computer software may include, for example, one or more modules of instructions, encoded on computer-readable storage medium for execution by, or to control the operation of, a data processing apparatus. Examples of a computer-readable storage medium include non-transitory medium such as random access memory (RAM) devices, read only memory (ROM) devices, optical devices (e.g., CDs or DVDs), and disk drives.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be executed on one computer or on multiple computers that are located at one site or distributed across multiple sites and interconnected by a communication network.

Some of the processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors and processors of any kind of digital computer. Generally, a processor will receive instructions and data from a read-only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer may not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations may be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Embodiments disclosed herein include:

A. A method that includes transmitting a narrowband signal into a formation using a transmitter located in a wellbore, wherein the narrowband signal is modified by passage through the formation and the formation reflects at least a portion of the narrowband signal back to the wellbore resulting in a modified narrowband signal having a first frequency, sensing the modified narrowband signal with an optical waveguide positioned in the wellbore, transmitting a source signal along a length of the optical waveguide and obtaining a backscattered return signal from the optical waveguide, the backscattered return signal being sampled at a second frequency that is less than the Nyquist rate of the modified narrowband signal, and processing the backscattered return signal to obtain an amplitude of the modified narrowband signal sensed with the optical waveguide.

B. A system that includes a transmitter located in a wellbore and generating a narrowband signal into a formation, wherein the narrowband signal is modified by passage through the formation and the formation reflects at least a portion of the narrowband signal back to the wellbore resulting in a modified narrowband signal having a first frequency, an optical waveguide positioned in the wellbore to sense the modified narrowband signal, and an interface to transmit a source signal along a length of the optical waveguide, obtain a backscattered return signal from the optical waveguide, sample the backscattered return signal at a second frequency less than the Nyquist rate of the modified narrowband signal, and process the backscattered return signal to obtain an amplitude of the modified narrowband signal.

C. A computer program product that includes a non-transitory computer readable medium having computer readable computer program code stored thereon that, when executed by a computer, configures the computer to transmit a narrowband signal into a formation using a transmitter located in a wellbore, wherein the narrowband signal is modified by passage through the formation and the formation reflects at least a portion of the narrowband signal back to the wellbore resulting in a modified narrowband signal having a first frequency, the modified narrowband signal being sensed by an optical waveguide positioned in the wellbore, program an interface to transmit a source signal along a length of the optical waveguide and obtain a backscattered return signal from the optical waveguide, the backscattered return signal being sampled at a second frequency that is less than the Nyquist rate of the modified narrowband signal, and program the interface to process the backscattered return signal to obtain an amplitude of the modified narrowband signal.

Each of embodiments A, B, and C may have one or more of the following additional elements in any combination: Element 1: further comprising processing the backscattered return signal to obtain the amplitude of the modified narrowband signal independent of the first frequency of the modified narrowband signal. Element 2: wherein sensing the modified narrowband signal on the optical waveguide comprises inducing strain in the optical waveguide via the modified narrowband signal. Element 3: further comprising processing the backscattered return signal using interferometric phase modulation techniques. Element 4: wherein processing the backscattered return signal comprises filtering the backscattered return signal using a low-pass filter having a cut off frequency equal to or below the first frequency. Element 5: further comprising controlling the transmitter to vary the amplitude of the modified narrowband signal. Element 6: further comprising varying a frequency of the narrowband signal transmitted into the formation and obtaining the modified narrowband signal including a spectrum of frequencies.

Element 7: wherein the interface processes the backscattered return signal to obtain the amplitude of the modified narrowband signal independent of the first frequency of the modified narrowband signal. Element 8: wherein the interface processes the backscattered return signal using interferometric phase modulation techniques. Element 9: wherein the interface filters the backscattered return signal using a low-pass filter having a cut off frequency equal to or below the first frequency. Element 10: wherein the interface controls the transmitter to vary the amplitude of the modified narrowband signal. Element 11: wherein the interface varies a frequency of the narrowband signal transmitted into the formation to obtain the modified narrowband signal including a spectrum of frequencies.

Element 12: wherein the computer is further configured to program the interface to process the backscattered return signal such that the amplitude of the modified narrowband signal is obtained independent of the first frequency of the modified narrowband signal. Element 13: wherein the computer is further configured to program the interface to process the backscattered return signal using interferometric phase modulation techniques. Element 14: wherein the computer is further configured to program the interface to filter the backscattered return signal using a low-pass filter having a cut off frequency equal to or below the first frequency. Element 15: wherein the computer is further configured to program the interface to control the transmitter to vary the amplitude of the modified narrowband signal. Element 16: wherein the computer is further configured to vary a frequency of the narrowband signal transmitted into the formation and obtain the modified narrowband signal including a spectrum of frequencies.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:
1. A method, comprising:
transmitting a narrowband signal into a formation using a transmitter located in a wellbore, wherein the narrowband signal is modified by passage through the formation and the formation reflects at least a portion of the narrowband signal back to the wellbore resulting in a modified narrowband signal;

sensing the modified narrowband signal with an optical waveguide positioned in the wellbore;

transmitting a source signal along a length of the optical waveguide, the source signal being modulated due to an interaction between the modified narrowband signal and the optical waveguide and thereby resulting in a backscattered return signal;

sampling the backscattered return signal at less than a Nyquist rate and obtaining an undersampled backscattered return signal; and processing the undersampled backscattered return signal to obtain an amplitude of the modified narrowband signal sensed with the optical waveguide.

2. The method of claim 1, further comprising processing the undersampled backscattered return signal to obtain the amplitude of the modified narrowband signal independent of a frequency of the modified narrowband signal.

3. The method of claim 1, wherein the interaction between the modified narrowband signal and the optical waveguide induces strain in the optical waveguide.

4. The method of claim 1, further comprising processing the undersampled backscattered return signal using interferometric phase modulation.

5. The method of claim 1, wherein undersampled backscattered return signal comprises filtering the undersampled backscattered return signal using a low-pass filter having a cut off frequency equal to or below a frequency of the modified narrowband signal.

6. The method of claim 1, further comprising controlling the transmitter to vary the amplitude of the modified narrowband signal.

7. The method of claim 1, further comprising varying a frequency of the narrowband signal transmitted into the formation and obtaining the modified narrowband signal including a spectrum of frequencies.

8. A system, comprising:

a transmitter located in a wellbore and generating a narrowband signal into a formation, wherein the narrowband signal is modified by passage through the formation and the formation reflects at least a portion of the narrowband signal back to the wellbore resulting in a modified narrowband signal;

an optical waveguide positioned in the wellbore and interacting with the modified narrowband signal; and an interface configured to:

transmit a source signal along a length of the optical waveguide, the source signal being modulated due to the interaction between the modified narrowband signal and the optical waveguide and thereby resulting in a backscattered return signal obtained from the optical waveguide, sample the backscattered return signal at less than a Nyquist rate and obtain an undersampled backscattered return signal, and process the undersampled backscattered return signal to obtain an amplitude of the modified narrowband signal.

9. The system of claim 8, wherein the interface processes the undersampled backscattered return signal to obtain the amplitude of the modified narrowband signal independent of a frequency of the modified narrowband signal.

10. The system of claim 8, wherein the interface processes the undersampled backscattered return signal using interferometric phase modulation.

11. The system of claim 8, wherein the interface filters the undersampled backscattered return signal using a low-pass filter having a cut off frequency equal to or below a frequency of the modified narrowband signal.

12. The system of claim 8, wherein the interface controls the transmitter to vary the amplitude of the modified narrowband signal.

13. The system of claim 8, wherein the interface varies a frequency of the narrowband signal transmitted into the formation to obtain the modified narrowband signal including a spectrum of frequencies.

14. A computer program product comprising a non-transitory computer readable medium having computer readable computer program code stored thereon that, when executed by a computer, configures the computer to:

control a transmitter located in a wellbore to transmit a narrowband signal into a formation, wherein the narrowband signal is modified by passage through the formation and the formation reflects at least a portion of the narrowband signal back to the wellbore resulting in a modified narrowband signal, the modified narrowband signal interacting with an optical waveguide positioned in the wellbore;

program an interface to transmit a source signal along a length of the optical waveguide, the source signal being modulated due to the interaction between the modified narrowband signal and the optical waveguide and thereby resulting in a backscattered return signal obtained from the optical waveguide, the backscattered return signal being sampled at less than a Nyquist rate to obtain an undersampled backscattered return signal; and program the interface to process the undersampled backscattered return signal to obtain an amplitude of the modified narrowband signal.

15. The computer program product of claim 14, wherein the computer is further configured to program the interface to process the undersampled backscattered return signal such that the amplitude of the modified narrowband signal is obtained independent of a frequency of the modified narrowband signal.

16. The computer program product of claim 14, wherein the computer is further configured to program the interface to process the undersampled backscattered return signal using interferometric phase modulation.

17. The computer program product of claim 14, wherein the computer is further configured to program the interface to filter the undersampled backscattered return signal using a low-pass filter having a cut off frequency equal to or below a frequency of the modified narrowband signal.

18. The computer program product of claim 14, wherein the computer is further configured to program the interface to control the transmitter to vary the amplitude of the modified narrowband signal.

19. The computer program product of claim 14, wherein the computer is further configured to control the transmitter to vary a frequency of the narrowband signal transmitted into the formation and obtain the modified narrowband signal including a spectrum of frequencies.

* * * * *